(12) United States Patent
Kang et al.

(10) Patent No.: US 6,812,430 B2
(45) Date of Patent: Nov. 2, 2004

(54) GLASS CUTTING METHOD AND APPARATUS WITH CONTROLLED LASER BEAM ENERGY

(75) Inventors: Hyoung Shik Kang, Seongnam-si (KR); Soon Kug Hong, Seongnam-si (KR); Seok Chang Oh, Pyungtaek-si (KR); Min Gyu Song, Pyungtaek-si (KR); Kwang Yeol Baek, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/134,429

(22) Filed: Apr. 30, 2002

(65) Prior Publication Data

US 2003/0201261 A1 Oct. 30, 2003

(51) Int. Cl.⁷ ............................ B23K 26/38; B23K 26/40
(52) U.S. Cl. ............................ 219/121.72; 219/121.61; 219/121.67; 219/121.8
(58) Field of Search ................. 219/121.67, 121.72, 219/121.61, 121.62, 121.8; 225/2, 5, 93.5

(56) References Cited

U.S. PATENT DOCUMENTS

| | | | |
|---|---|---|---|
| 5,961,852 A | * | 10/1999 | Ralfa-Yuan et al. ... 219/121.69 |
| 5,968,382 A | * | 10/1999 | Matsumoto et al. ... 219/121.72 |
| 6,211,488 B1 | * | 4/2001 | Hoekstra et al. ....... 219/121.72 |
| 6,236,446 B1 | * | 5/2001 | Izumi et al. ................. 349/187 |
| 6,327,875 B1 | * | 12/2001 | Allaire et al. |
| 6,346,687 B1 | * | 2/2002 | Kinoshita et al. |
| 6,407,360 B1 | * | 6/2002 | Choo et al. ............. 219/121.67 |
| 6,423,930 B1 | * | 7/2002 | Matsumoto ............ 219/121.69 |
| 6,489,588 B1 | * | 12/2002 | Hoekstra et al. ....... 219/121.67 |

FOREIGN PATENT DOCUMENTS

| | | | |
|---|---|---|---|
| JP | 5-305467 A | * | 11/1993 |
| JP | 2000-219528 A | * | 8/2000 |

\* cited by examiner

Primary Examiner—Geoffrey S. Evans
(74) Attorney, Agent, or Firm—Greenblum & Bernstein, P.L.C.

(57) ABSTRACT

A glass cutting apparatus includes a positioning unit that positions a laser beam along a virtual line on a glass to be cut. A laser beam unit irradiates a laser beam onto the glass along the virtual line. The virtual line is divided into at least two portions and at least one of the two portions is divided into a plurality of sub-portions. The energy of the laser beam is maintained constant in each of the plurality of sub-portions. A related glass cutting method is also disclosed.

19 Claims, 8 Drawing Sheets

GLASS CUTTING METHOD AND APPARATUS WITH CONTROLLED LASER BEAM ENERGY

BACKGROUND OF THE INVENTION

1. Field of the Invention

The present invention relates to a glass cutting method and apparatus, and more particularly to a glass cutting method and apparatus in which cutting of glass is carried out using a laser beam and a coolant while varying the moving speed and energy of the laser beam, and the shape of the laser beam, thereby being capable of achieving an increase in glass cutting speed and an improvement in glass quality.

2. Description of the Related Art

As a representative glass cutting device, a device for cutting glass using a laser is known. Such a glass cutting device using a laser cuts glass by irradiating a laser beam having an oval, U, or V shape, thereby heating the surface of the glass, and spraying a coolant just after the irradiation of the laser beam.

Referring to FIG. 1a, a conventional glass cutting method utilizing a temperature gradient is illustrated. In accordance with this method, a glass 2 is heated to a temperature not more than the melting point thereof using a laser beam 1, and a coolant 3 is sprayed onto the heated glass 2, thereby cutting the glass 2. FIG. 1b illustrates the glass cut in accordance with the glass cutting method. In FIG. 1b, the cut glass pieces are denoted by the reference numeral 2a'.

Another conventional glass cutting method is illustrated in FIG. 2a. In accordance with this method, a line is scratched on a glass tube 2b which is, in turn, heated by an oval laser beam emitted from a laser 1b. The heated glass tube 2b is then cooled by a cotton cloth 3b wet with water, so that it is cut along the scratched line. FIG. 2b illustrates glass tubes 2b' cut by the above mentioned glass cutting method.

Another conventional glass cutting method is illustrated in FIG. 3. In accordance with this method, a glass 2c is heated by an oval laser beam emitted from a laser 1c. The heated portion of the glass 2c is then cooled by a coolant fluid 3c, thereby causing the glass 2c to be cut.

FIG. 4 illustrates another conventional laser glass cutting method in which a glass 2d is cut along a curved line using a laser 1d irradiating a U or V-shaped laser beam, and a coolant 3d.

In accordance with the above mentioned laser glass cutting techniques, cutting of a glass is carried out by irradiating a laser beam having an oval, U, or V shape onto the glass to heat the surface of the glass, and then spraying a liquid or gas onto the heated portion of the glass to cool the heated glass portion.

Meanwhile, before the cutting of the glass 2, a scratch line is drawn, using a diamond wheel 4, on the leading or trailing portion of a cutting line, along which the glass is to be cut, in accordance with these laser glass cutting techniques, as shown in FIG. 5.

The laser 1 is then moved along the glass 2 to irradiate a laser beam onto the glass 2 formed with the scratch line, thereby heating the glass 2. Thereafter, the coolant sprayer sprays a coolant 3 onto the heated portion of the glass 2 while moving at a certain speed, thereby causing the glass to be cut.

That is, in accordance with the convention laser glass cutting techniques, cutting of glass is carried out by irradiating a laser beam from a laser with a desired energy onto the glass while moving the laser along a scratch line formed on the glass, thereby heating the glass, and spraying a coolant onto the heated portion of the glass, thereby cooling the glass. However, these conventional laser glass cutting techniques have a problem in that the cut surface of the glass is rough because the glass is heated by the laser beam which is irradiated onto the glass using a uniform energy while being moved from a leading portion of the glass to a trailing portion of the glass at a constant speed, in spite of the fact that the glass exhibits different stress distributions at respective portions thereof, that is, the leading and trailing portions, and an intermediate portion arranged between the leading and trailing portions, when it is heated. In particular, there is a problem in that it is impossible to easily cut the glass at the leading and trailing glass portions.

Where the energy density of the laser beam irradiated onto the glass at the leading and trailing glass portions is excessive, the surface of the glass may be abruptly heated, so that it is thermally damaged. As a result, the cut surface of the glass may be damaged. On the other hand, where the energy density of the irradiated laser beam is insufficient, a lot of time is undesirably taken to cut the glass.

SUMMARY OF THE INVENTION

Therefore, the present invention has been made in view of the above mentioned problems, and an object of the invention is to provide a glass cutting method and apparatus in which cutting of glass is carried out using a laser beam while appropriately adjusting the moving speed and energy of the laser beam for respective portions of the glass, so that the glass can be rapidly and accurately cut.

Another object of the invention is to provide a glass cutting method and apparatus capable of preventing a localization of thermal stress generated at the surface of glass when a laser beam is irradiated onto the glass, thereby forming a cut glass surface having a good quality.

In accordance with one aspect, the present invention provides a glass cutting method comprising the steps of irradiating a laser beam onto a virtual cutting line on a glass to be cut while moving the laser beam along the virtual cutting line, thereby heating the glass, and spraying a coolant onto the heated glass, thereby cutting the glass, wherein the glass is divided, along the virtual cutting line, into leading, intermediate, and trailing portions, and the laser beam has a moving speed and energy controlled so that the moving speed and energy are gradually increased as the laser beam moves from the leading glass portion to the intermediate glass portion, while being gradually decreased as the laser beam moves from the intermediate glass portion to the trailing glass portion.

In accordance with another aspect, the present invention provides a glass cutting apparatus comprising: a first beam generating unit for irradiating a laser beam to form scratch lines on a glass to be machined; a second beam generating unit for irradiating a primary laser beam onto the glass 11 to heat the glass along the scratch lines; and a coolant sprayer for spraying a coolant onto the glass to cut the heated glass.

Each of the leading, intermediate, and trailing glass portions may be divided into a plurality of sub-portions, the moving speed and energy of the laser beam being constant within each of the sub-portions.

The moving speed of the laser beam may be varied proportionally to a variation in energy density of the laser beam.

The laser beam may have a leading portion and a trailing portion respectively forming, on the glass, an image having a leading portion with a large area, and a trailing portion with a small area. In this case, the leading image portion has an energy density less than that of the trailing image portion.

Preferably, the laser beam has a key hole shape.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1A:
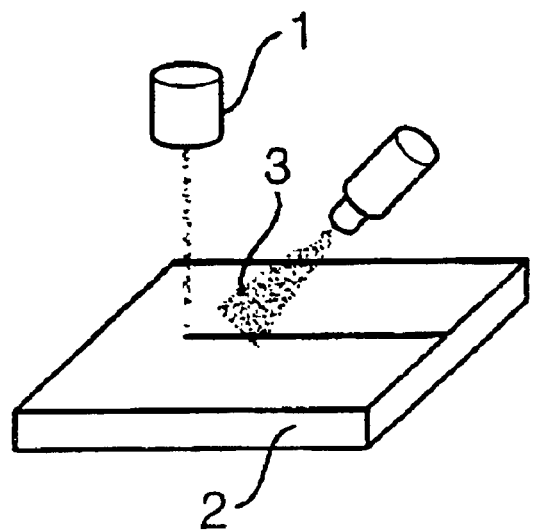
FIGS. 1a and 1b are perspective views respectively illustrating a conventional glass cutting apparatus, and a cutting procedure carried out by the glass cutting apparatus.
Figure 1B:
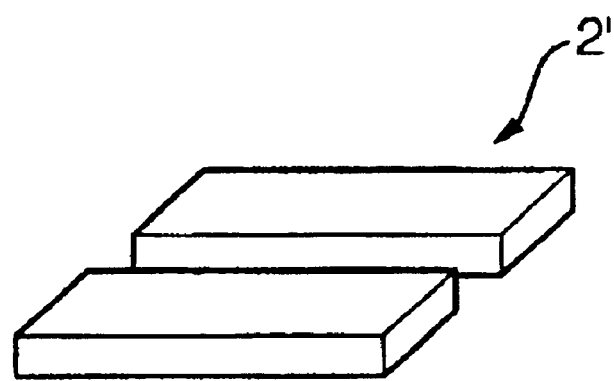
Figure 2A:
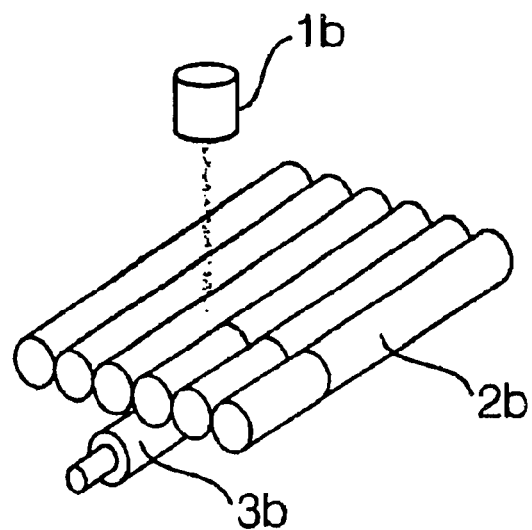
FIGS. 2a and 2b are perspective views respectively illustrating another conventional glass cutting apparatus, and a cutting procedure carried out by the glass cutting apparatus.
Figure 2B:
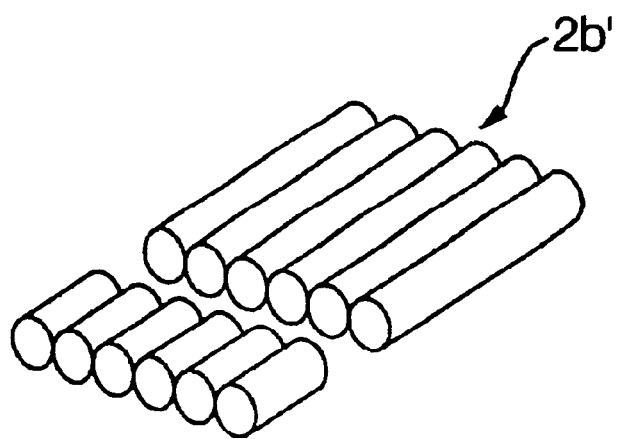
Figure 3:
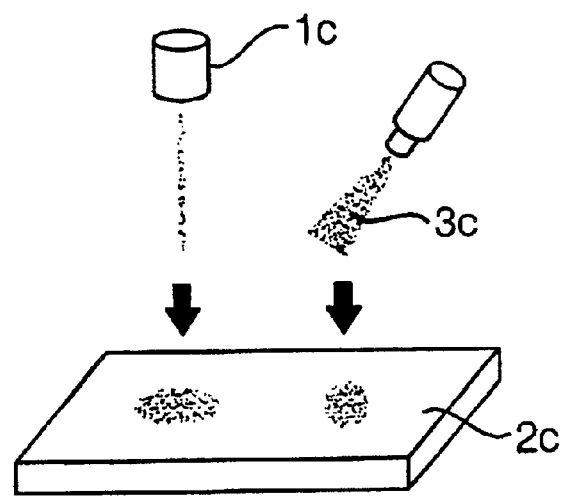
FIG. 3 is a perspective view illustrating another conventional glass cutting apparatus.
Figure 4:
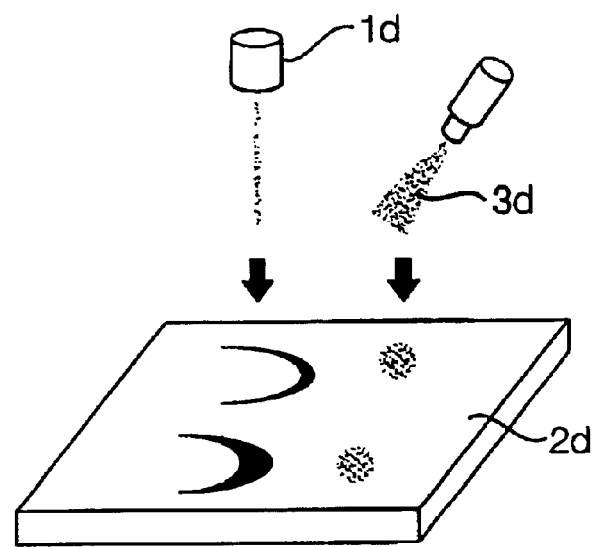
FIG. 4 is a perspective view illustrating another conventional glass cutting apparatus.
Figure 5:
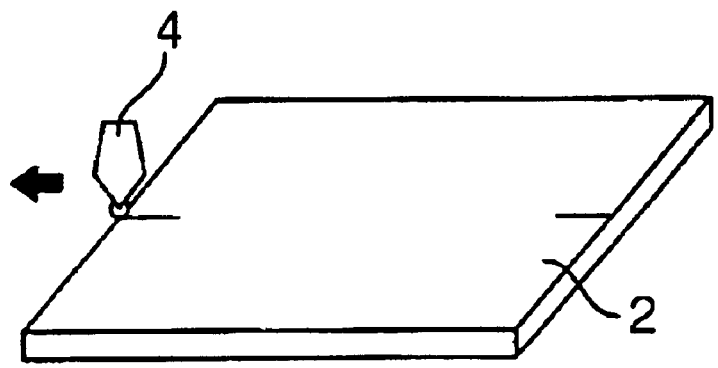
FIG. 5 is a perspective view illustrating a diamond wheel used in the conventional glass cutting apparatus.

Now, preferred embodiments of the present invention will be described in detail with reference to the annexed drawings.

Referring to FIGS. 6 to 9, a glass cutting apparatus according to the present invention is illustrated. As shown in FIGS. 6 to 9, the glass cutting apparatus includes a scratch line beam generating unit 12 for irradiating a short-wavelength laser beam to form scratch lines on a glass 11, a first cutting beam generating unit 13 for irradiating a primary laser beam onto the glass 11 to heat the glass 11 formed with the scratch lines, a coolant sprayer 14 for spraying a coolant onto the glass 11 to cut the heated glass 11, and a second cutting beam generating unit 15 for irradiating a secondary laser beam onto the cooled glass 11 to completely cut the glass 11.

Figure 9:
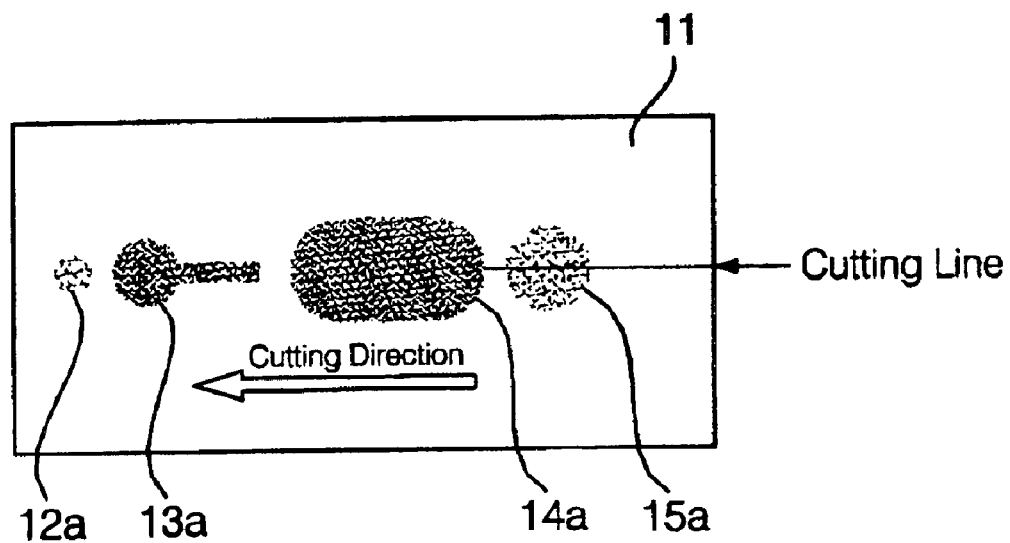
FIG. 9 is a plan view illustrating images formed on a glass by the glass cutting apparatus according to the present invention.

Respective images of a laser beam 12a emitted from the scratch line beam generating unit 12, a laser beam 13a emitted from the first cutting beam generating unit 13, a coolant 14a sprayed from the coolant sprayer 14, and a laser beam 15a emitted from the second cutting beam generating unit 15 on the glass 11 are illustrated in FIG. 9.

The scratch line beam generating unit 12 forms scratch lines on the glass 11 to be cut using the short-wavelength laser beam 12a in accordance with a non-contact etching process. The first cutting beam generating unit 13, coolant sprayer 14, and second cutting beam generating unit 15 are moved together along a virtual cutting line aligned with the scratch lines on the glass by a well-known feeding means.

Figure 10:
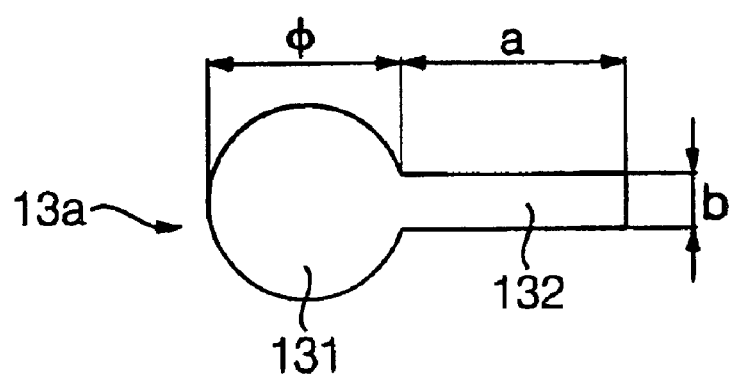
FIG. 10 is an enlarged plan view illustrating the image of a laser beam irradiated onto a glass by a beam generating unit included in the glass cutting apparatus according to the present invention.
Figure 11:
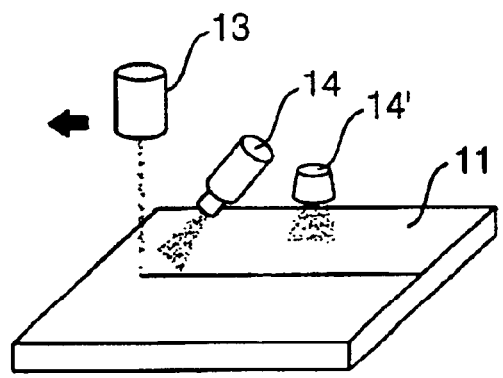
FIG. 11 is a perspective view illustrating a glass cutting apparatus according to another embodiment of the present invention.

As shown in FIG. 10, the laser beam 13a from the first cutting beam generating unit 13 irradiated onto the glass 11 has a key hole shape in accordance with a combination of laser lenses, in order to effectively heat the glass 11.

The key hole structure of the laser beam 13a has a leading portion 131 and a trailing portion 132, when viewed in the cutting direction of the glass 11. The leading laser beam portion 131 has a circular shape, whereas the trailing laser beam portion 132 has a rectangular shape. Preferably, the length ratio of the leading laser beam portion 131 to the trailing laser beam portion 132, $\Phi/a$, is 0.2 to 0.5. Also, the width ratio of the leading laser beam portion 131 to the trailing laser beam portion 132, , $\Phi/b$, is preferably 2 to 5. The energy density of the leading laser beam portion 131 preferably corresponds to 40 to 80% of the energy density of the trailing laser beam portion 132. When the laser beam 13a is irradiated onto the glass 11, heating of the glass 11 is carried out in such a fashion that the glass 11 is pre-heated by the leading laser beam portion 131, and then completely heated by the trailing laser beam portion 132 to a high temperature, because the energy density of the leading laser beam portion 131 is less than that of the trailing laser beam portion 132. Accordingly, an increase in tensile stress occurs at the surface of the glass 11, thereby achieving an increase in cutting speed.

Meanwhile, the coolant 14a from the coolant sprayer 14 is sprayed in the form of a slot onto the glass 11 at a time 0.1 to 0.5 second after the irradiation of the laser beam 13a, in order to obtain an enhanced glass cooling effect. By virtue of the sprayed coolant 14a, the glass 11 is formed with an over-cooled region at a central portion of its coolant sprayed region, and a cooled region at a peripheral portion around the central portion.

The second cutting beam generating unit 15 irradiates the laser beam 15a onto the glass 11 subjected to a primary cutting process by the sprayed coolant 14a, thereby heating the glass 11 so that the glass 11 is completely cut.

Figure 6:
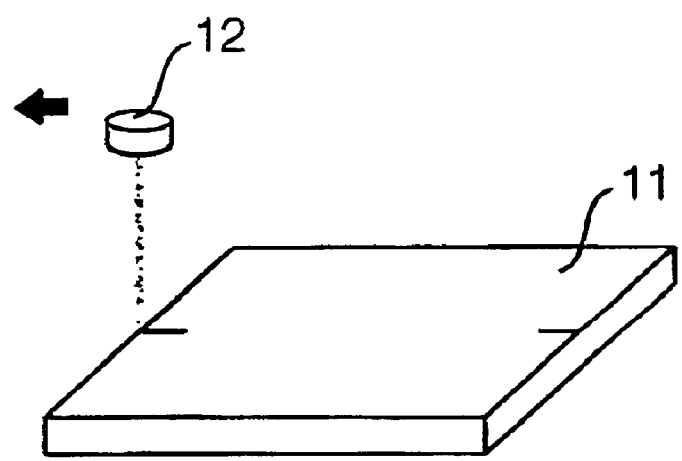
FIGS. 6 and 7 are perspective views respectively illustrating a scratch line beam generating unit included in a glass cutting apparatus according to the present invention.

As shown in FIG. 6, the scratch lines are formed at the leading and trailing ends of the cutting portion of the glass 11 by the laser beam 12a emitted from the scratch line beam generating unit 12, respectively. The laser beam 12 is a short-wavelength laser beam capable of being easily absorbed by the glass 11. Since the scratch line beam generating unit 12 is of a non-contact type, there is no possibility of a degradation in straightness occurring after a prolonged time of use. The formation of scratch lines can be applied even to the case in which cutting lines are to be intersected. In particular, there is an advantage in this case.

Figure 7:
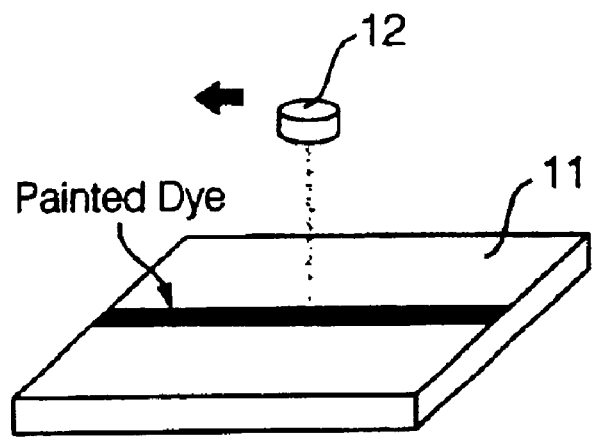
Figure 8:
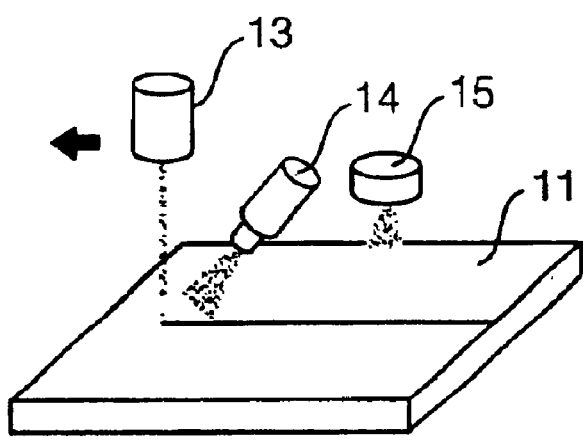
FIG. 8 is a perspective view illustrating the glass cutting apparatus according to the present invention.

The short-wavelength laser beam has a wavelength ranging from 100 nm to 600 nm. This short-wavelength laser beam is effective because laser beams of a shorter wavelength can be more easily absorbed in the glass 11. Where a laser beam having a wavelength of more than 600 nm is to be used, a dye is preferably painted on the surface of the glass 11 in order to allow the laser beam to be easily absorbed, as shown in FIG. 7.

A material having a high vaporization ability is used as the coolant adapted to cool the heated glass 11 for the primary cutting process. This coolant can achieve an improvement in cooling effect, as compared to conventional gas coolants. This coolant also provides an advantage in that there is no residue of the coolant because the coolant is rapidly vaporized.

For a solid coolant having a high vaporization ability, a material is used which is changed into a solid phase when it is sprayed in a liquid phase in air. For example, solid carbon dioxide grains (dry-ice), which are formed when liquid carbon dioxide is sprayed in air, may be used.

Where a liquid coolant, which is not rapidly vaporized, is used, a coolant removing means 14' may be arranged downstream from the coolant sprayer 14, in order to heat the liquid coolant left on the surface of the glass 11, thereby vaporizing the left liquid coolant simultaneously with the execution of the primary cutting process for the glass 11.

For the coolant removing means 14', an additional beam generating unit, air heater or high-power sucking appliance may be used.

In accordance with the present invention, each of the leading, intermediate, and trailing cutting portions of the glass 11 may be divided into a plurality of sub-portions, in order to control the energy of the laser beam to be irradiated, the amount of the coolant to be sprayed, and the moving speed of the laser beam, and the focus length of the laser beam, for individuals of the sub-portions, if necessary. In this case, it is possible to rapidly cut the glass 11 while achieving an improvement in quality at the leading and trailing portions of the glass 11.

Figure 12:
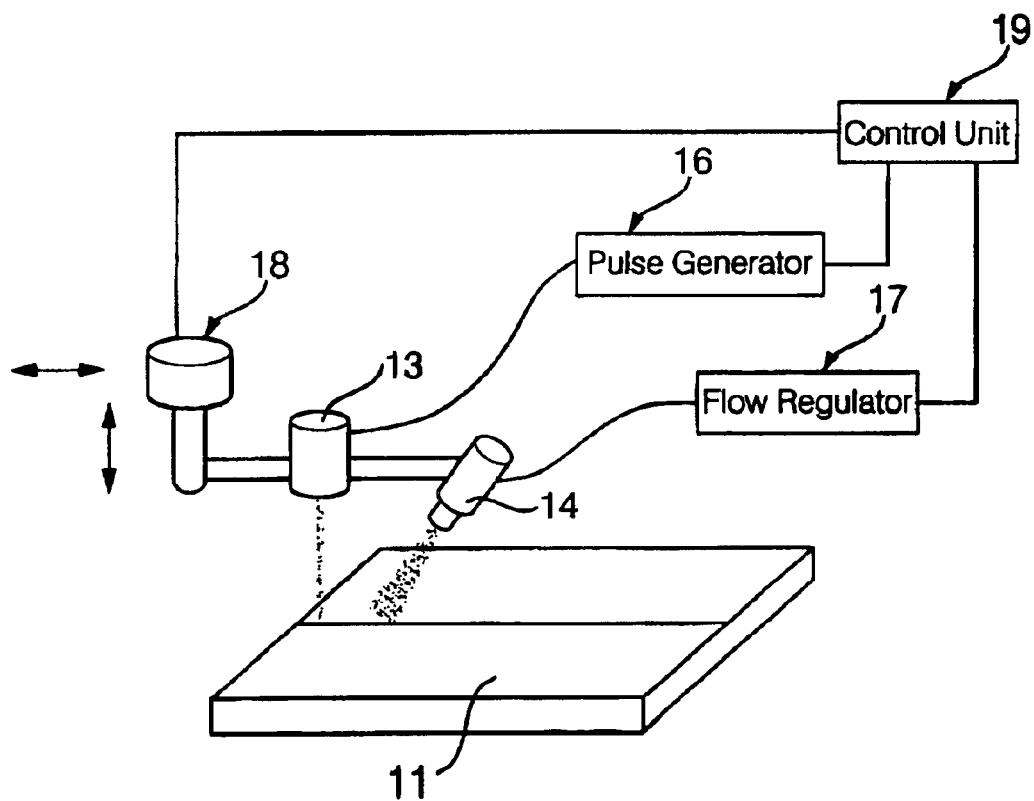
FIG. 12 is a perspective view illustrating a glass cutting apparatus according to another embodiment of the present invention.

In order to control the energy and moving speed of the laser beam and the sprayed amount of the coolant for individuals of the sub-portions, the glass cutting apparatus of the present invention includes a configuration illustrated in FIG. 12. That is, the glass cutting apparatus includes a pulse generator 16 for varying the energy of the laser beam, a flow regulator 17 for regulating the flow rate of the coolant sprayed from the coolant sprayer 14, a driving unit 18 for adjusting the moving speed of the laser beam, and the distance between the beam generating unit 13 and the glass 11, and a control unit 19 for controlling the pulse generator 16, flow regulator 17 and driving unit 18 to vary output values from the pulse generator 16, flow regulator 17 and driving unit 18.

For variations in the moving speed and energy of the laser beam for individuals of sub-sections, the glass to be cut is divided in a longitudinal direction into a leading portion, an intermediate portion, and a trailing portion, each of which is, in turn, divided in the longitudinal direction into a plurality of sub-portions. For example, the leading glass portion may be divided into 2 to 4 sub-portions, the intermediate glass portion may be divided into 1 to 2 sub-portions, and the trailing glass portion may be divided into 1 to 3 sub-portions. The leading glass portion is set to have a length of 10 to 80 mm, the trailing glass portion is set to have a length of 20 to 60 mm, and the intermediate glass portion is set to include the remaining portion of the glass except for the leading and trailing glass portions.

The control of the laser beam for individual glass portions is carried out in such a fashion that the moving speed and energy density of the laser beam are gradually increased as the laser beam moves from the leading glass portion toward the intermediate glass portion, while being gradually decreased as the laser beam moves from the intermediate glass portion toward the trailing glass portion.

Meanwhile, the moving speed and energy density of the laser beam are constant within each sub-portion of each glass portion. In each glass portion, the energy density of the laser beam is varied proportionally to a variation in the moving speed of the laser beam.

That is, in the leading and trailing portions of the glass where it is difficult to carry out the heating and cutting processes due to a localization of thermal stress generated at those portions upon the heating process, a laser beam with a low energy is irradiated while being slowly moved. As the laser beam is moved toward the intermediate glass portion, its energy and moving speed are gradually increased, in order to achieve an improvement in the quality of the cut glass product, and a rapid glass cutting operation.

The energy of the laser beam is controlled within a range of 10 to 150 W, depending on respective glass portions. The moving speed of the laser beam is controlled within a range of 1 to 200 mm/s, depending on respective glass portions.

Figure 13:
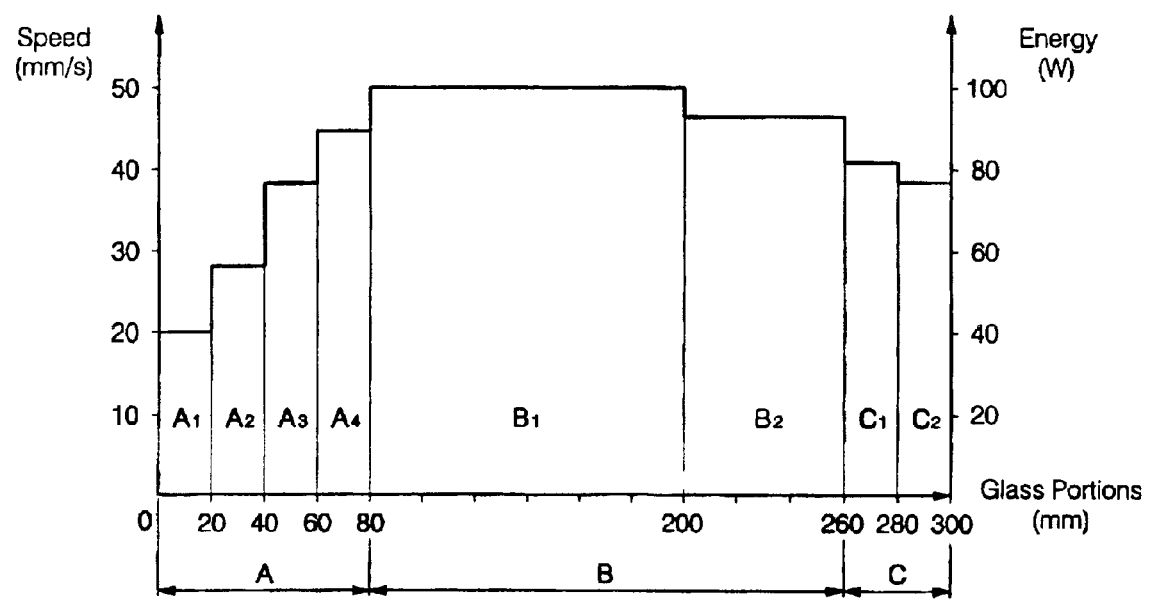
FIG. 13 is a graph depicting variations in the moving speed and energy of a laser beam at respective glass portions in accordance with a glass cutting method of the present invention.

Referring to FIG. 13, a variation in the moving speed of the laser beam at respective glass portions in accordance with an embodiment of the present invention is illustrated.

In the case of FIG. 13, the glass to be cut has a total length of 300 mm. The glass is divided into leading, intermediate, and trailing portions A, B, and C. The leading glass portion A is divided into 4 sub-portions $A_1$ to $A_4$ each having a length of 20 mm, whereas the intermediate glass portion B is divided into 2 sub-portions $B_1$ and $B_2$ respectively having lengths of 120 mm and 60 mm. The trailing glass portion C is divided into 2 sub-portions $C_1$ and $C_2$ each having a length of 20 mm.

As shown in FIG. 13, the moving speed and energy of the laser beam are gradually increased as the laser beam moves from the sub-portion $A_1$ to the sub-portion $B_1$, while being gradually decreased as the laser beam moves from the sub-portion $B_1$ to the sub-portion $C_2$.

As apparent from the above description, the present invention provides a glass cutting method and apparatus in which the laser beam to be irradiated onto a glass to be machined has a leading portion with a low energy density, and a trailing portion with a high energy density, thereby being capable of maximizing the thermal impact applied to the glass when the laser beam is irradiated, whereas the glass is divided into a plurality of glass portions, for which the moving speed and energy of the laser beam are controlled to meet respective thermal stress distributions at those glass portions, thereby being capable of achieving an improvement in the quality of the cut glass surface while achieving a rapid glass cutting process.

What is claimed is:

1. A glass cutting method comprising:
   determining a virtual line on a glass to be cut;
   irradiating a laser beam on the glass along the virtual line to cut the glass, the virtual line dividing the glass into at least two portions, at least one of the two portions being divided into a plurality of sub-portions; and
   maintaining the energy of the laser beam, for at least two of the plurality of sub-portions, to be different than each other and to be constant within each of the plurality of sub-portions.

2. The glass cutting method according to claim 1, further comprising maintaining constant a moving speed of the laser beam within each of the plurality of sub-portions.

3. The glass cutting method according to claim 1, wherein the at least two portions comprise a leading portion, an intermediate portion, and a trailing portion along a direction of movement of the laser beam.

4. The glass cutting method according to claim 3, wherein the leading portion has a length of 10–80 millimeters.

5. The glass cutting method according to claim 3, wherein the trailing portion has a length of 20–60 millimeters.

6. The glass cutting method according to claim 1, further comprising providing the laser beam with a shape including at least two parts.

7. The glass cutting method according to claim 6, further comprising providing the laser beam with a keyhole shape.

8. The glass cutting method according to claim 6, wherein the shape of the leading portion of the laser beam is circular and the trailing portion of the laser beam is rectangular.

9. The glass cutting method according to claim 1, the irradiating heating the glass and further comprising applying a coolant onto the heated glass to cut the glass.

10. A glass cutting apparatus comprising:
a positioning unit that is configured to position a laser beam along a virtual line on a glass to be cut; and
a laser beam unit configured to irradiate a laser beam on the glass along the virtual line to cut the glass, the virtual line being divided into at least two portions, at least one of the two portions being divided into a plurality of sub-portions, an energy of the laser beam being maintained for at least two of the plurality of sub-portions, to be different than each other and to be constant within each of said plurality of sub-portions.

11. The glass cutting apparatus according to claim 10, wherein a moving speed of the laser beam is maintained constant in each sub-portion.

12. The glass cutting apparatus according to claim 10, wherein the at least two portions include a leading portion, an intermediate portion, and a trailing portion in a direction of laser beam movement.

13. The glass cutting apparatus according to claim 12, wherein the leading portion has a length of 10–80 millimeters.

14. The glass cutting apparatus according to claim 12, wherein the trailing portion has a length of 20–60 millimeters.

15. The glass cutting apparatus according to claim 10, wherein a shape of the laser beam includes at least two portions.

16. The glass cutting apparatus according to claim 15, wherein a shape of a leading portion of the laser beam is circular and a shape of a trailing portion of the laser beam is rectangular.

17. The glass cutting apparatus according to claim 15, wherein the shape of the laser beam is a keyhole.

18. The glass cutting apparatus according to claim 10, the laser beam heating the glass and further comprising applying a coolant to the heated glass to cut the glass.

19. A glass cutting method comprising:
irradiating a laser beam onto a virtual cutting line on a glass to be cut while moving the laser beam along the virtual cutting line;
spraying a coolant onto the glass, wherein the glass is divided, along the virtual cutting line, into leading, intermediate and trailing glass portions, each of the leading, intermediate and trailing glass portions are divided into a plurality of sub-portions; and
moving the laser beam and controlling the energy of the laser beam so that the moving speed and the energy of the laser beam gradually increase as the laser beam moves from the leading glass portion to the intermediate glass portion and the energy and moving speed are gradually decreased as the laser beam moves from the intermediate glass portion to the trailing glass portion, and maintaining the moving speed and the energy of the laser beam constant within each of the sub-portions.

* * * * *